US 6,594,266 B1

(12) United States Patent
Kim

(10) Patent No.: US 6,594,266 B1
(45) Date of Patent: Jul. 15, 2003

(54) METHOD OF ROUTING ATM CELL IN ATM NETWORK

(75) Inventor: Dong-Sung Kim, Kyonggi-do (KR)

(73) Assignee: LG Information & Communication, Ltd., Seoul (KR)

( * ) Notice: Subject to any disclaimer, the term of this patent is extended or adjusted under 35 U.S.C. 154(b) by 0 days.

(21) Appl. No.: 09/389,600

(22) Filed: Sep. 3, 1999

(30) Foreign Application Priority Data

Sep. 3, 1998 (KR) .............................. 98-36352

(51) Int. Cl.[7] .............................. H04L 12/28

(52) U.S. Cl. .................. 370/395.6; 370/389; 370/386

(58) Field of Search ................. 370/398, 466, 370/467, 342, 389, 386, 395.6–395.65, 395.1, 474, 469; 709/227, 228; 714/751

(56) References Cited

PUBLICATIONS

ITU–T Recommendation 1.363.2, Series I: Integrated Services Digital Network—Overall network aspects and functions—Protocol layer requirements, date Sep. 1997, pp. 1–44.

ITU–T Recommendation 1.363.5, Series I: Integrated Services Digital Network—Overall network aspects and functions—Protocol layer requirements, date Aug. 1996, pp. 1–50.

Primary Examiner—Hassan Kizou
Assistant Examiner—John Pezzlo
(74) Attorney, Agent, or Firm—Fleshner & Kim, LLP

(57) ABSTRACT

A method of routing an ATM cell in an ATM network and routing an ATM cell and a structure of an ATM adaptation layer in an ATM network. Data based on an ALL-Type2 (ATM Adaptation Layer Type2) and an AAL-Type5 (ATM Adaptation Layer Type5) is transferred to the same destination. This enables data based on ATM adaptation layers of different types to be transferred to the same destination at the same time.

12 Claims, 4 Drawing Sheets

METHOD OF ROUTING ATM CELL IN ATM NETWORK

BACKGROUND OF THE INVENTION

1. Field of the Invention

The present invention relates to a method of routing an ATM cell in an ATM network, and more particularly, to a method of routing an ATM cell and a structure of an ATM adaptation layer in an ATM network in which data based on an AAL-Type2 (ATM Adaptation Layer Type2) and an AAL-Type5 (ATM Adaptation Layer Type5) is transferred to the same destination.

2. Discussion of Related Art

In general, the most basic function in a communication network is to select a desired party among a large number of subscribers, connect circuits and freely exchange necessary information.

The ATM switching system among switching systems develops a packet switching principle and simply processes a packet in the midst of a transmission so as to gain a highly speedy operation similar to that in a circuit switching system. The ATM switching system may exchange various information signals having several kinds of natures freely, efficiently, thus this system is very useful for the next generation communication system based on future multimedia information. This ATM switching system can be applied to a desired wired section between a base station and an exchange station, or between the exchange station and a controller.

A protocol stack of individual network elements constructing the ATM network, for example, a base station, an exchange station, etc., is generally composed of an ATM layer, an ATM adaptation layer positioned over the ATM layer, and a user application layer positioned over the ATM adaptation layer. Among them the ATM adaptation layer is classified into an AAL Type1 through an AAL-Type5 according to an object and a characteristic of a user application and a kind of a service class, wherein the AAL-Type2 through the AAL-Type5 are mainly used in a mobile radio communication system.

In the AAL (ATM Adaptation Layer)-Type2, one ATM cell can be multiplexed, therefore can provide a band for the sake of an efficient transmission of a low-rate, short and variable length packet in the user application sensitive to a delay. That is, the AAL-Type2 requires a real time process and is utilized to process sound or image data based on a small quantity of data.

Meantime, the AAL-Type5 improves a service provided by the ATM layer in order to support a function required by its next higher rank layer. The AAL-Type5 performs a function required by a user and a controlling and managing plane, and supplies a mapping between the ATM layer and its next higher rank layer. Thus the AAL-Type5 is used to process connection oriented/connectionless higher rank application user data, e.g., a packet or an IP service, of non-real time and variable length.

The AAL-Type2 and the AAL-Type5 are described referring to the recommendation, I.363.2 and I.363.5 of Telecommunication Standardization Sector of ITU (ITU-T) provided in International Telecommunication Union, as follows.

FIG. 1 represents a protocol stack for the AAL-Type2 based on the ITU-T recommendation. With reference to FIG. 1, the protocol stack of AAL-Type2 based on the ITU-T recommendation is made up of an ATM layer 100, an ATM adaptation layer 200 formed at a higher rank than the ATM layer 100 and subdivided into a common part sublayer (CPS) and a service specific convergence sublayer (SSCS), and a user application layer 300 positioned at a higher rank than the ATM adaptation layer 200. Herewith, AAL-Type2 negotiation procedures (ANP) provides a channel identifier (CID) for individual mini cells which construct one ATM cell.

First, described is in the following a case that data is transferred from the user application layer 300 to the ATM layer 100 through the ATM adaptation layer 200. The data outputted from the user application layer 300 is transferred to the SSCS through an AAL-SAP (Service Access point) 60. The SSCS performs a call linkage operation to the user application layer 300, and transfers the received data to the Common Part Sublayer CPS. The CPS turns the data received from the SSCS into a common part sublayer protocol data unit (CPS-PDU) having a 48 octet type according to a service class as shown in FIG. 1, and transfers it to the ATM layer 100 through an ATM-SAP 13. This CPS-PDU is constructed by a start field 20 containing start information of a field every an ATM cell and by numerous mini cells 30 through 50 which are respectively composed of each of mini cell headers 31,41,51 and each of transmission data 32,42, 52. Then, each multiplexized mini cell 30–50 is transferred to a service terminating point desired by a user through one ATM layer connection having one virtual channel identification/virtual path identification value.

Next, operations on the AAL-Type2 are described for a case that the ATM layer 100 receives data in an ATM cell type, as follows. When the ATM layer 100 receives the ATM cell 10, it is transferred to the ATM adaptation layer 200 through the ATM-SAP 13. The CPS analyzes the start field 20 of the received ATM cell 10 and contents of the headers 31,41,51 of each mini cell 30–50, and transfers it to the SSCS. The SSCS each transfers the respective user data 32,42,52 to a corresponding user application layer through the AAL-SAP 60 according to the header 31,41,51 of the mini cell 30–50.

FIG. 2 indicates a protocol stack for the AAL-Type5 based on the ITU-T recommendation. In FIG. 2, the protocol stack of AAL-Type5 based on the ITU-T recommendation is made up of the ATM layer 100, the ATM adaptation layer 200 formed at a higher rank than the ATM layer 100 and subdivided into a convergence sublayer (CS) and a segmentation and reassembly sublayer (SAR), and the user application layer 300 positioned at a higher rank than the ATM adaptation layer 200.

As shown in FIG. 2, one ATM layer is suitable to the structure for servicing one kind of data which mainly means packet data. Therefore, the AAL-Type5 does not have a multiplexing operation for connecting several factors since the mini cells are not used in the inside thereof.

In the following described is a case that data is transferred from the user application layer 300 to the ATM layer 100 through the ATM adaptation layer 200. The data outputted from the user application layer 300 is provided to the CS through the AAL-SAP 60. The CS performs a mapping for the data into a conversions sublayer protocol data unit (CS-PDU) of a 48xn octet type as shown in FIG. 2, and transfers it to the SAR, wherein n is an integer. The SAR subdivides the received data by the 48 octet type, and transfers the subdivided data to the ATM layer 100 through the ATM-SAP 13.

Also, operations for the AAL-Type2 are described as follows, in a case that the ATM layer 100 receives the data in an ATM cell type. When the ATM layer 100 receives the ATM cell 10, the data is transferred to the SAR of the ATM adaptation layer 200 through the ATM-SAP 13. The SAR re-combines the received data by the octet type of 48xn and provides the combined data to the user application layer 300 through the AAL-SAP 60, wherein n represents an integer. Herein, a PAD (Packet Assembly and Disassembly) & trailer 40 provides each of a PAD field and a trailer field, the PAD field indicating an octet presented so that an overall payload becomes a multiple of 48xn in an ending part of a payload 30, the trailer field representing a common part indicator, length and CRC.

However, the ATM adaptation layer of respective elements equipped in such conventional ATM network is provided as only one kind of ATM adaptation layer determined previously in an aspect of a hardware. In other words, each ATM network element is supported in hardware so as to transmit and receive only a characteristic of its own dealing information, an object of a communication, and specific data matched with a service class.

The ATM adaptation layers over two kinds may be, of course, determined in one ATM network element, but in this case, the construction of the ATM network element becomes very complicated in hardware, so such an actual construction is not executed.

Accordingly, data based on the ATM adaptation layers of mutually different types could not be transferred to the same destination at the same time, conventionally. For example, in case data of the AAL-Type2 and the AAL-Type5 types was transferred, all of the data was not processed but only data capable of being processed in a current ATM adaptation layer was processed.

SUMMARY OF THE INVENTION

Accordingly, the present invention is directed to a method of routing an ATM cell in an ATM network that substantially obviate one or more of the limitations and disadvantages of the related art.

A primary object of the present invention is to provide a method of routing an ATM cell on an ATM adaptation layer (AAL) in an ATM network in which data based on an AAL-Type2 and an AAL-Type5 can be simultaneously transferred to the same destination by improving the structure of the ATM adaptation layer for individual elements of the ATM network.

Another object of the present invention is to provide the structure of the ATM adaptation layer in an ATM network for supporting a protocol in which an AAL-Type2 and an AAL-Type5 are transferred to the same destination at the same time.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, in a first characteristic, the method of routing an ATM cell on an ATM adaptation layer (AAL) in an ATM network, comprises the steps of: transmitting ATM cells from a plural number of originating party network elements to terminating party network elements through ATM switches according to an ATM adaptation layer type of the originating party network elements, in an ATM network; adding routing information to ATM cell headers on the basis of the ATM cell, on the ATM adaptation layer of the terminating party network element, the routing information being for performing an internal routing of the ATM adaptation layer in the terminating party; and transferring the ATM cell to a corresponding destination on the basis of the routing information of the ATM cell header on the ATM cell adaptation layer of the terminating party network element.

In a second characteristic for achieving another object of the present invention, the structure of the ATM adaptation layer in the ATM network is constructed by an AAL-Type5 sublayer for processing ATM cells of the ATM adaptation layer Type5; and an AAL routing switch controlling layer for adding up AAL routing information for performing a routing to the ATM cell header according to its destination when the received ATM cell passes through the AAL-Type2 or AAL-Type5 sublayer, and switching it to the destination according to the AAL routing information, and these AAL-Type2 sublayer and AAL-Type5 sublayer commonly possess the AAL routing switch controlling layer.

In accordance with such inventive characteristics, the ATM adaptation layer is subdivided into the AAL-Type2 sublayer and the AAL-Type5 sublayer, and the header information for performing the routing is added up in the interior of the ATM adaptation layer in case that an ATM cell to be transmitted passes through the AAL-Type2 sublayer or the AAL-Type5 sublayer. Accordingly, the ATM cell can be transferred to the destination regardless of a type of a transmission ATM cell, e.g., the AAL-Type2 or the AAL-Type5, in one ATM network element based on the present invention.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

Figure 3:
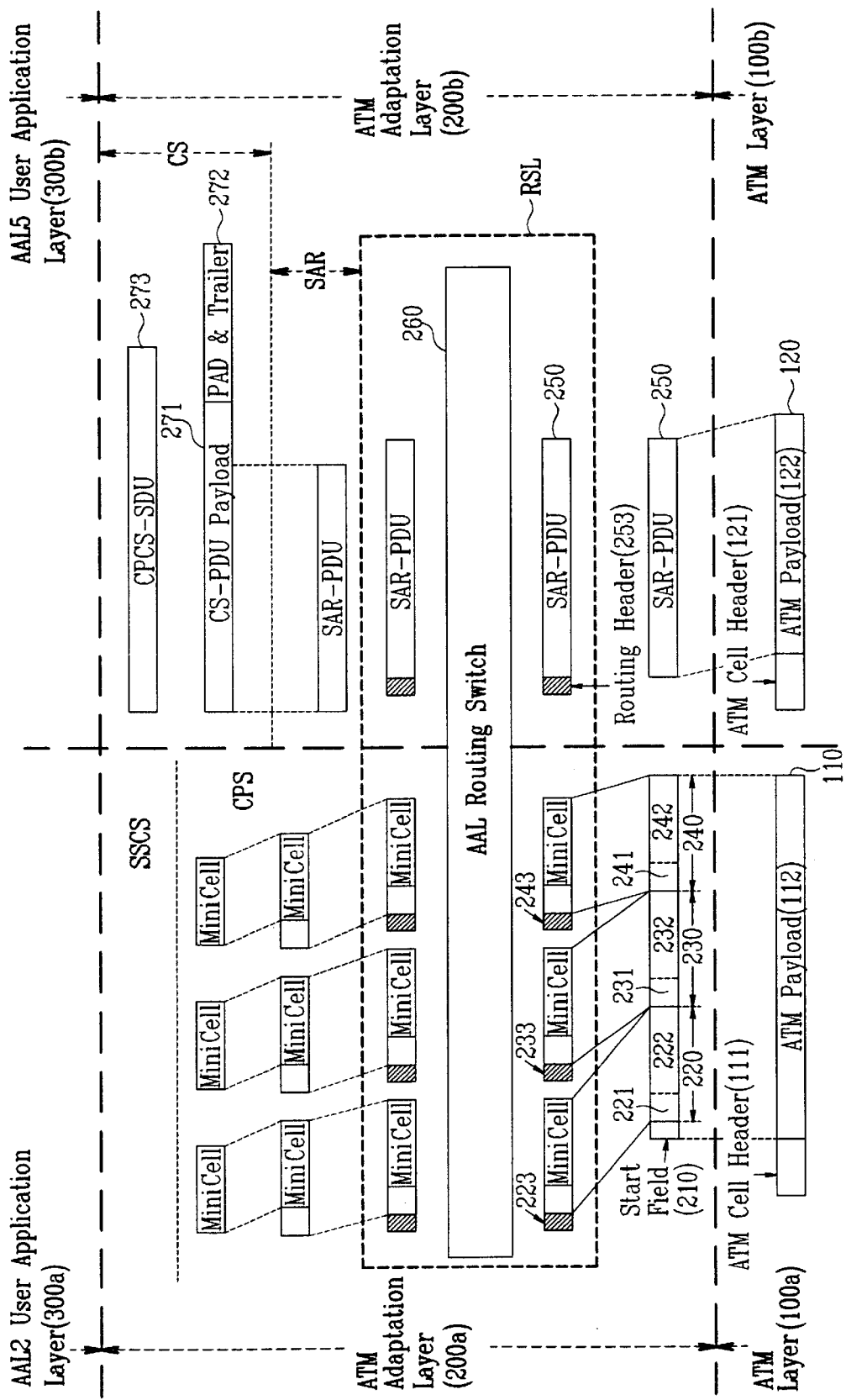
Figure 4:
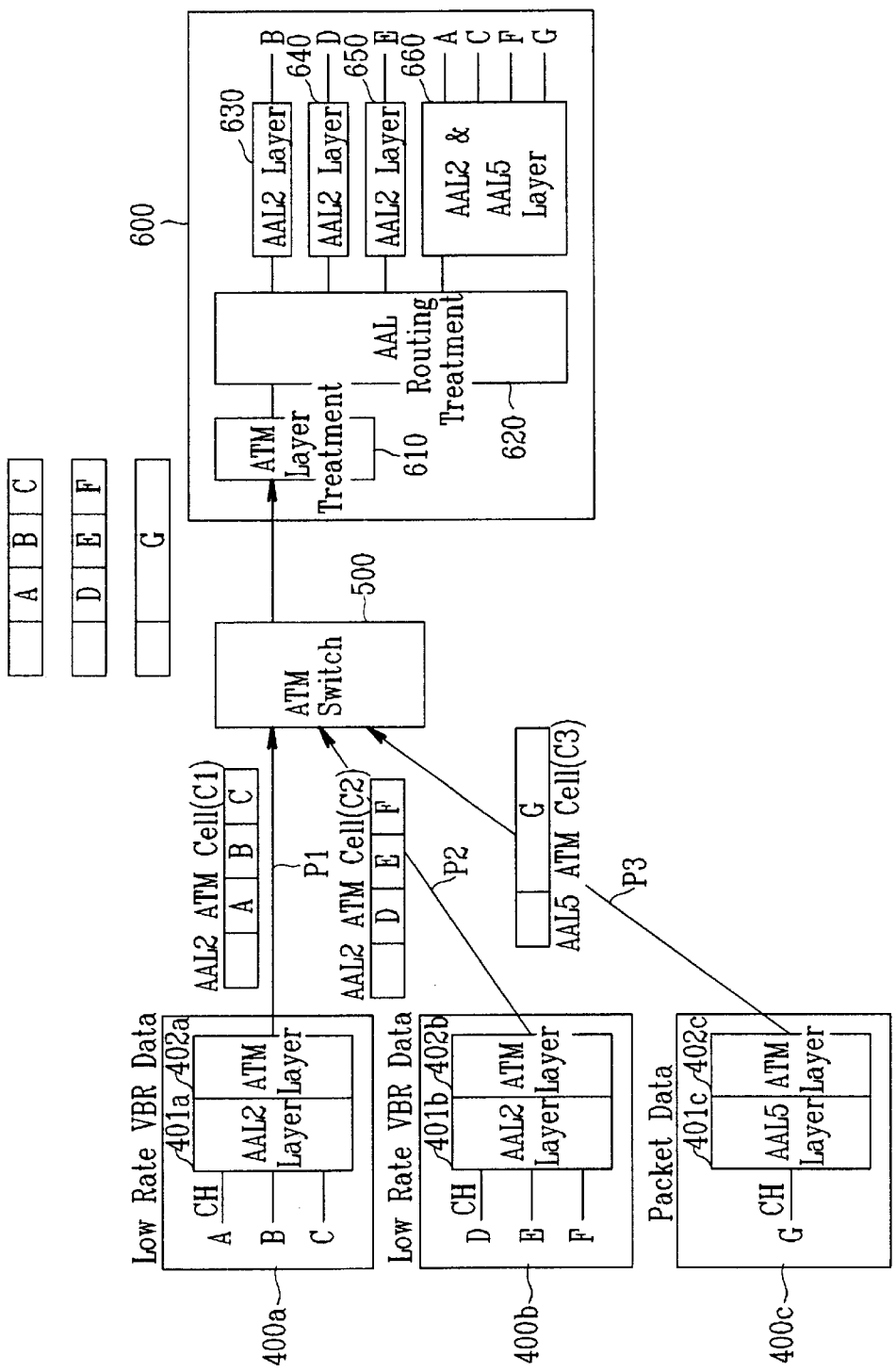

FIG. 3 indicates a protocol stack for an ATM adaptation layer in accordance with the present invention; and FIG. 4 provides a description for a routing procedure of the ATM adaptation layer on an inventive ATM network.

DETAILED DESCRIPTION OF PREFERRED EMBODIMENT

Reference will now be made in detail to the preferred embodiments of the present invention, examples of which are illustrated in the accompanying drawings.

FIG. 3 sets forth a protocol stack for an ATM adaptation layer in accordance with the present invention. Referring to FIG. 3, the protocol stack of the inventive ATM adaptation layer is subdivided into an AAL-Type2 sublayer and an AAL-Type5 sublayer. The AAL-Type2 sublayer and the AAL-Type5 sublayer add each of AAL routing headers 223,233,243,253 up before each of headers 221,231,241 of mini cells 220,230,240 and before an SAR-PDU (250) according to a destination of the ATM adaptation layer in numerous mini cells 220–240 included into one ATM cell 110 transferred from ATM layers 100*a*, 100*b* or in one SAR-PDU (Protocol Data Unit) 250. Also, the AAL-Type2 sublayer and the AAL-Type5 sublayer commonly possess an AAL routing switch controlling layer (RSL) for performing a switching to a destination of the ATM adaptation layer according to the added AAL routing headers 223,233,243, 253.

The AAL-Type2 sublayer is positioned between the ATM layer 100*a* for transmitting and receiving an ATM cell and a user application layer 300*a*, and is subdivided into the AAL routing switch controlling layer (RSL), a common part sublayer (CPS) and a service specific convergence sublayer (SSCS) on a higher rank than the ATM layer 100*a*. The AAL-Type2 sublayer is positioned between the ATM layer 100*a* for transmitting and receiving an ATM cell and a user application layer 300*a*, and is subdivided into the AAL routing switch controlling layer (RSL), a common part sublayer (CPS) and a service specific convergence sublayer (SSCS) on a higher rank than the ATM layer 100*a*. The AAL-Type5 sublayer is positioned between the ATM layer 100*b* for transmitting and receiving the ATM cell and a user application layer 300*b*, and is subdivided into the AAL routing switch controlling layer (RSL), a convergence sublayer (CS) and a segmentation and reassembly sublayer (SAR).

The AAL routing switch controlling layer (RSL) is equipped with an AAL routing switch 260 for performing a switching to a destination of a corresponding ATM adaptation layer according to the added AAL routing headers 223,233,243,253.

In FIGS. 3 and 4, a routing procedure of an ATM cell is described in an ATM network based on one embodiment of the present invention, as follows.

FIG. 4 provides a description for a routing procedure of the ATM adaptation layer on an inventive ATM network, which describes a case that a plural number of originating party network terminal equipments transfer several kinds of data by an ATM cell type to the same receiving party terminal.

In FIG. 4, an ATM cell based on the AAL-Type2 type generated from a network terminal equipment 400*a* is connected to an ATM switch 500 through one ATM layer connection, referring to one VCI/VPI value and channel identifier CID. In this network terminal equipment 400*a*, it is predetermined that channel data, A,B,C, in a low bit rate is multiplexed and transferred to a payload field of one ATM cell C1 by using the mini cell.

Further, an ATM cell based on the AAL-Type2 type generated from a network terminal equipment 400*b* is connected to the ATM switch 500 by another VCI/VPI value different from the VCI/VPI value used in the network terminal equipment 400*a*. Numerous channel data, D,E,F, is also multiplexed in a payload field of the ATM cell C2.

An ATM cell based on the AAL-Type5 type generated from a network terminal equipment 400*c* is generated as one ATM cell C3 under non-multiplex state, and is connected to the ATM switch 500.

The ATM switch 500 performs a switching for transmission data and transfers it to its destination, only by ATM cell header added from the ATM layer of each network terminal equipment, namely only by a VCI/VPI value. Thus, three ATM cells C1–C3 are not changed in their respective interior multiplex structure, but are changed only in the VCI/VPI value according to a switch connection position.

At this time, the destination of three ATM cells C1–C3 is a network terminal equipment 600. If the protocol stack based on the present invention shown in FIG. 3 is applied to the network equipment 600, an ATM layer treatment 610 of the network terminal equipment 600 performs a change for which ATM headers of the received ATM cells have the interior routing information of the TM adaptation layer. That is to say, the AAL routing headers are added up onto front parts of the data B,D,E,A,C,F,G of each mini cell or SAR-PDU unit according to the connection destination of the ATM adaptation layer interior. In an addition position of the AAL routing header, as shown in FIG. 3, it is added in a front part of each mini cell header 221,231,241 in a case of the AAL-Type2, and it is added in a front part of the SAR-PDU (Segmentation and Reassembly-Packet Data Unit) 250 in a case of the AAL-Type5. An AAL routing treatment 620 processes data outputted from the ATM layer treatment 610, in other words, executes a common or partial routing process for Type2 and Type5 of the ATM adaptation layer.

The AAL routing switch 260 shown in FIG. 3 thus switches the inputted ATM cell to a corresponding destination according to the AAL routing header added up to each cell.

At this time, as shown in FIG. 3, since a processing time point of the sublayer to which the AAL layer routing header is added, is not same in the AAL-Type2 and the AAL-Type5, it should be maintained in the same way as the conventional case a function of the respective AAL sublayers and the interior protocol between the respective sublayers, excepting the AAL routing switch controlling layer (RSL) having an addition of the header for performing a routing to a corresponding destination.

Figure 1:
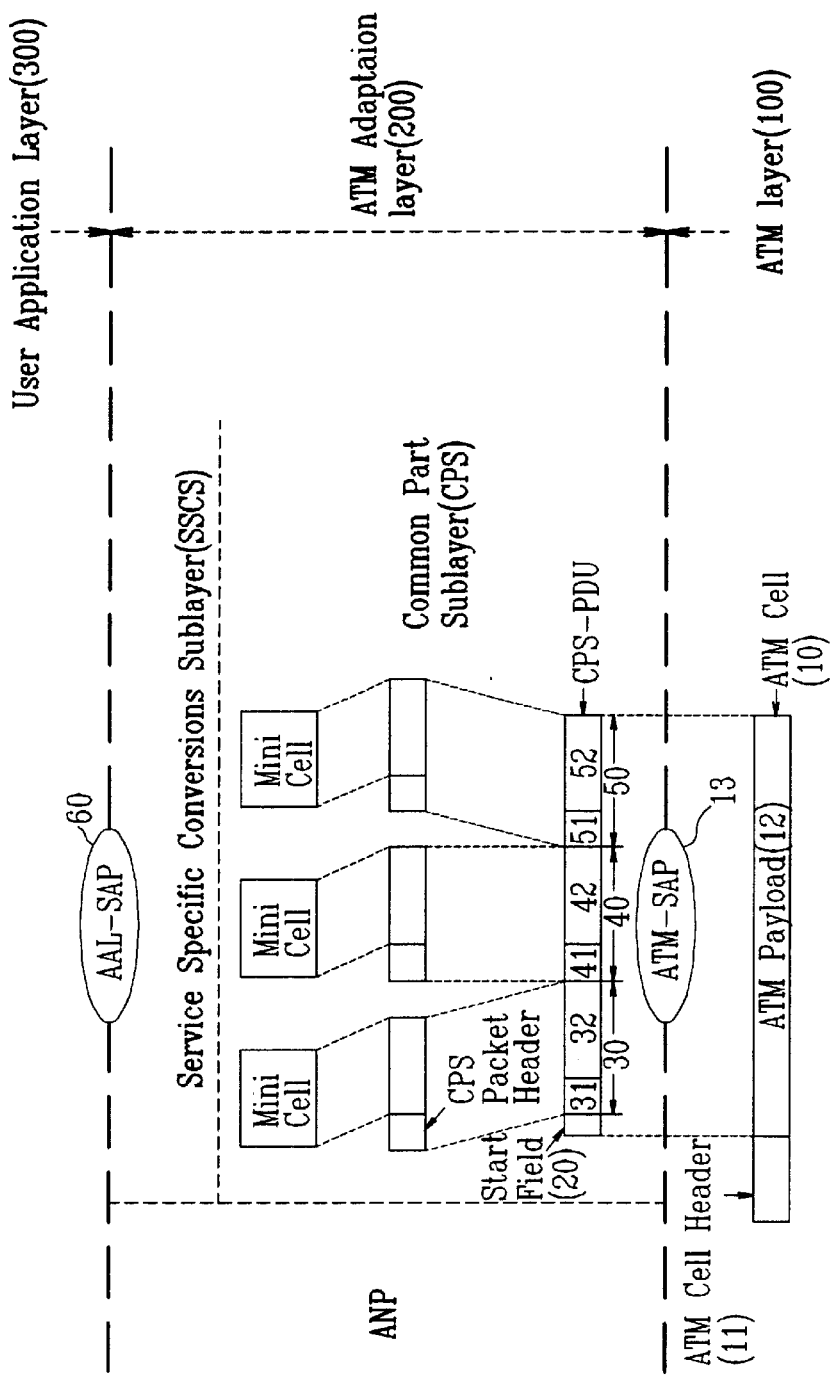
FIG. 1 shows a protocol stack of an AAL-Type2 based on the ITU-T recommendation.
Figure 2:
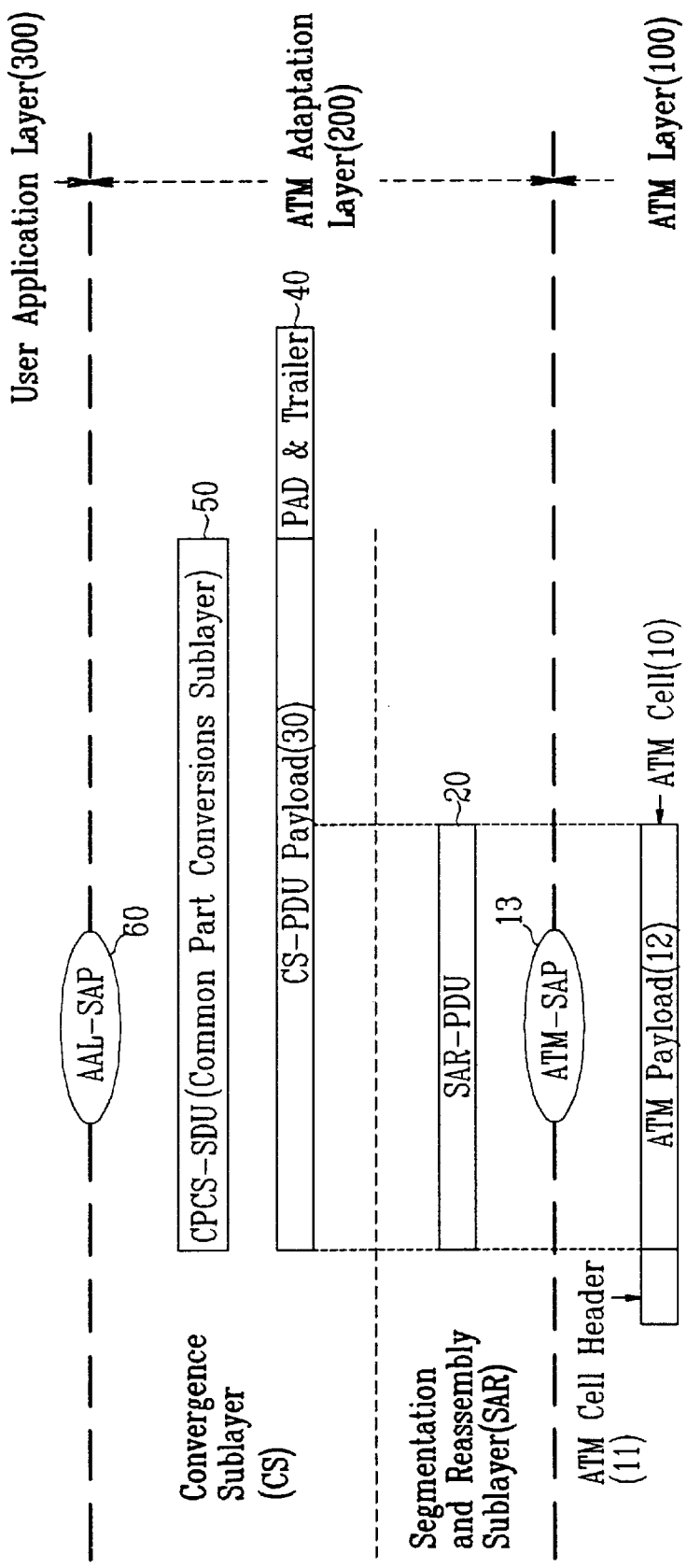
FIG. 2 represents a protocol stack of an AAL-Type5 based on the ITU-T recommendation.

In the AAL-Type2, accordingly, the AAL routing header should be generated by additionally referring to a channel identifier (CID) for the mini cell transferred from the AAL-Type2 negotiation part (ANP) or AAL-composite user (AAL-CU) sublayer shown in FIG. 1, together with a reference to the VCI/VPI value. In the AAL-Type5 system, the AAL routing header is also generated with reference to the VCI/VPI value added through specific signal channel information and channel identifier CID from the interior of the ATM layer.

The ATM cell transmission based on mutually different types is gotten by respectively providing the AAL routing headers with the identifiers of the AAL-Type2 and the AAL-Type5, by such difference.

As afore-mentioned, in accordance with the present invention, there is a processable effect for the ATM cells when the ATM cells of the AAL-Type2 and the AAL-Type5 are transferred to the same destination at the same time in the ATM network to which the inventive ATM adaptation layer is applied. That is, one improved ATM adaptation layer in accordance with the invention can process all data of the AAL-Type2 and the AAL-Type5. Accordingly, each element of the ATM network can process the ATM cell suitably to an object and a characteristic of wide information and a service class without an additional installment in hardware, to thereby improve a service quality of the communication network. This invention is very suitable to provide a multimedia communication through a use of the existing ATM network in a case of its application to the next generation radio communication system (IMT-2000).

It will be apparent to those skilled in the art that various modifications and variations can be made in the ATM cell routing method of the ATM network of the present invention without deviating from the spirit or scope of the invention.

Thus, it is intended that the present invention cover the modifications and variations of this invention provided they come within the scope of the appended claims and their equivalents.

What is claimed is:

1. A method of routing an ATM cell in an ATM network comprising:

transmitting ATM cells from a plural number of originating party network elements to terminating party network elements through ATM switches according to an ATM adaptation layer type of the originating party network elements, in the ATM network;

adding routing information to the ATM cell on the basis of ATM cell type, on an ATM adaptation layer of said terminating party network element, said routing information being for performing an internal routing of the ATM adaptation layer in the terminating party; and transferring the ATM cell to a corresponding destination on the basis of the routing information of the ATM cell header on the ATM cell adaptation layer of the terminating party network element.

2. The method of claim 1, wherein the ATM cell transmitting step by the ATM adaptation layer type comprises the steps of:

transmitting the ATM cell of an ATM adaptation layer Type2;

transmitting the ATM cell of an ATM adaptation layer Type5; and connecting said ATM cells to the ATM switch through one ATM layer connection.

3. The method of claim 1, wherein the routing information adding step to the ATM cell header on the basis of the ATM cell, comprises:

adding a routing header having the routing information up before a header of each mini cell in a case of the ATM cell for the ATM adaptation layer Type2 composed of numerous mini cells; and adding the routing header having the routing information onto a front part of a protocol data unit (SAR-PDU) in a case of the ATM cell for the ATM adaptation layer Type5 constructed by the protocol data unit.

4. The method of claim 3, wherein the routing information for the case of the ATM cell of the ATM adaptation layer Type2 is generated according to a channel identifier (CID) provided from the interior of the ATM adaptation layer and a VCI/VPI value added through specific signal channel information.

5. The method of claim 3, wherein the routing information for the case of the ATM cell of the ATM adaptation layer Type5 is generated according to the VCI/VPI value added through the specific signal channel information.

6. A structure of an ATM adaptation layer in an ATM network comprising:

an AAL-Type2 sublayer for processing ATM cells of an ATM adaptation layer Type2;

an AAL-Type5 sublayer for processing ATM cells of an ATM adaptation layer Type5; and an AAL routing switch controlling layer for adding AAL routing information for performing a routing of the ATM cell, to the processed ATM cell according to its destination when the received ATM cell passes through the AAL-Type2 or AAL-Type5 sublayer, and for switching it to the destination according to the AAL routing information, wherein said AAL-Type2 sublayer and AAL-Type5 sublayer commonly possess said AAL routing switch controlling layer.

7. The structure of claim 6, wherein said AAL-Type2 sublayer is subdivided into the AAL routing switch controlling layer (RSL), a common part sublayer (CPS) and a service specific convergence sublayer (SSCS).

8. The structure of claim 6, wherein said AAL-Type5 sublayer is subdivided into the AAL routing switch controlling layer (RSL), a convergence sublayer (CS) and a segmentation and reassembly sublayer (SAR).

9. The structure of claim 6, wherein said AAL routing switch controlling layer (RSL) equips an AAL routing switch for performing a switching to a corresponding destination of the ATM adaptation layer according to said AAL routing header.

10. The structure of claim 6, wherein said AAL routing switch controlling layer (RSL) each adds routing headers having routing information up before a header of each mini cell in a case of the ATM cell for the ATM adaptation layer Type2 composed of numerous mini cells, and addes the routing header having the routing information onto a front part of a protocol data unit (SAR-PDU) in a case of the ATM cell for the ATM adaptation layer Type5 constructed by the protocol data unit.

11. The structure of claim 10, wherein said routing information for a case of the ATM cell of the ATM adaptation layer Type2 is generated according to a channel identifier (CID) provided from the interior of the ATM adaptation layer and a VCI/VPI value added through specific signal channel information.

12. The structure of claim 10, wherein said routing information for the case of the ATM cell of the ATM adaptation layer Type5 is generated according to the VCI/VPI value added through the specific signal channel information.

* * * * *